United States Patent [19]

Uramoto

[11] Patent Number: 5,712,774
[45] Date of Patent: Jan. 27, 1998

[54] DEVICE FOR SUPPRESSING HIGHER HARMONIC CURRENT OF POWER SOURCE

[75] Inventor: Hiroshi Uramoto, Hadano, Japan

[73] Assignee: Ricoh Company, Ltd., Tokyo, Japan

[21] Appl. No.: 802,791

[22] Filed: Feb. 18, 1997

Related U.S. Application Data

[63] Continuation of Ser. No. 392,085, Feb. 22, 1995, abandoned.

[30]     Foreign Application Priority Data

Feb. 24, 1994   [JP]   Japan ..................... 6-026830

[51] Int. Cl.$^6$ ..................................... H02M 1/12
[52] U.S. Cl. .................. 363/46; 363/89; 323/288; 323/209; 323/300
[58] Field of Search .................. 363/46, 53, 89; 323/209, 299, 288, 300

[56]       References Cited

U.S. PATENT DOCUMENTS 4,710,861  12/1987  Kanner ..................... 363/46
4,949,234   8/1990  Gulczynski ............... 363/48
5,001,620   3/1991  Smith ....................... 363/89
5,103,388   4/1992  Williams et al. ......... 363/69
5,331,534   7/1994  Suzuki et al. ............ 363/20

FOREIGN PATENT DOCUMENTS

2 226 197  12/1973  Germany.
1 558 473   1/1980  United Kingdom.

*Primary Examiner*—Peter S. Wong
*Assistant Examiner*—Shawn Riley
*Attorney, Agent, or Firm*—Oblon, Spivak, McClelland, Maier & Neustadt, P.C.

[57]            ABSTRACT

A device for suppressing higher harmonic current of a power source and applicable to a switching power source, air conditioner with an inverter, lamp regulator or the like. The device suppresses higher harmonic current by increasing the conduction angle of input current.

10 Claims, 7 Drawing Sheets

BEFORE SMOOTHING → AFTER SMOOTHING

DEVICE FOR SUPPRESSING HIGHER HARMONIC CURRENT OF POWER SOURCE

This application is a continuation of application Ser. No. 08/392,085, filed on Feb. 22, 1995, now abandoned.

BACKGROUND OF THE INVENTION

1. Field of the Invention

The present invention relates to a device for suppressing the higher harmonic current of a power source and is applicable to a switching power source, air conditioner with an inverter, lamp regulator or similar electric equipment.

2. Discussion of the Background

Modern household appliances and office automation apparatuses are equipped with a high frequency inverter for miniaturization. Most of the state-of-the-art inverter power sources are implemented by a diode rectifying circuit for a commercial power source. Specifically, assume that a capacitor is inserted in a diode rectifying circuit for a commercial power source in order to smooth the output of a diode. Then, current input to the circuit has a pulse-like waveform different from a sinusoidal input waveform and contains many higher harmonics. Higher harmonic current distorts voltage in a power system. Recently, the distortion of voltage has brought about various problems including higher harmonics troubles, heating of power equipment, and damage to a force ratio improving capacitor. In light of this and to prepare for future regulations, measures against higher harmonics are in study.

Two different approaches for regulating the higher harmonic current of a power source are taught in "Regulation and Measure against Higher Harmonics Distortion in Power System/Measuring Techniques" published by Trikeps, White Series No. 143, Chapter 5. One of them is to insert a great reactor in the input while the other is to use an electronically controllable active filter. The active filter scheme is superior to the reactor scheme in respect of the control over higher harmonic current in a power source. In addition, the active filter scheme reduces the size (weight), compared to the reactor scheme. However, the reactor scheme is also acceptable in practice and is even advantageous over the active filter scheme as to the cost, efficiency, and noise control.

SUMMARY OF THE INVENTION

It is an object of the present invention to provide a device capable of suppressing higher harmonic current and which has a small size (light weight).

A device for suppressing the higher harmonic current of a power source of the present invention has a switching element for causing a capacitor, included in a capacitor input type rectifying circuit for a commercial power source, to selectively charge or discharge, a voltage detecting circuit for detecting a sinusoidal voltage out of the commercial power source and generating a signal when the sinusoidal voltage is lower than a predetermined voltage, and a control circuit for turning on the switching element in response to a signal from the voltage detecting circuit to thereby cause the capacitor to release a charge.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENT

Figure 7:
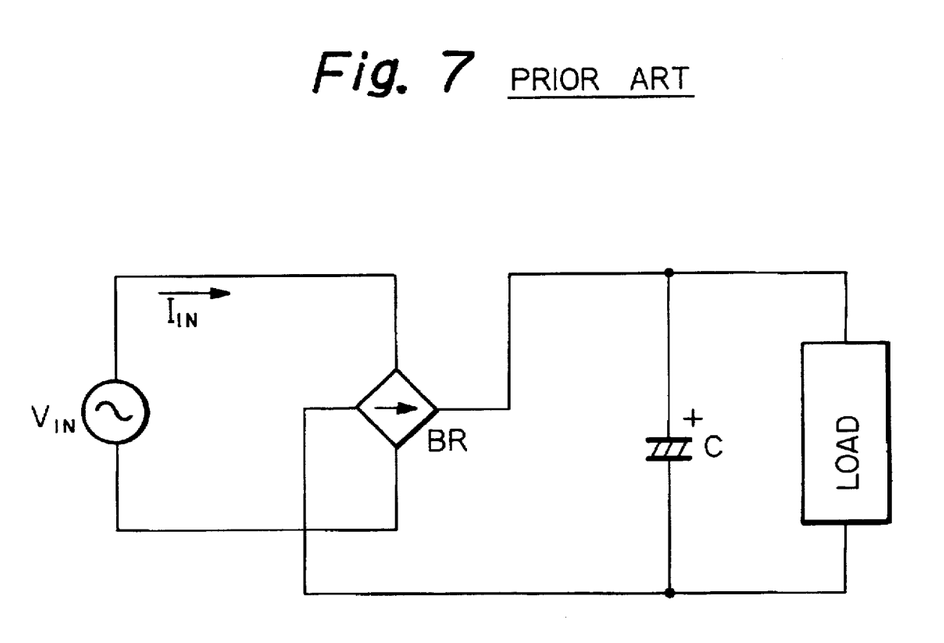
FIG. 7 is a circuit diagram showing a conventional capacitor input type rectifying circuit.
Figure 8A:
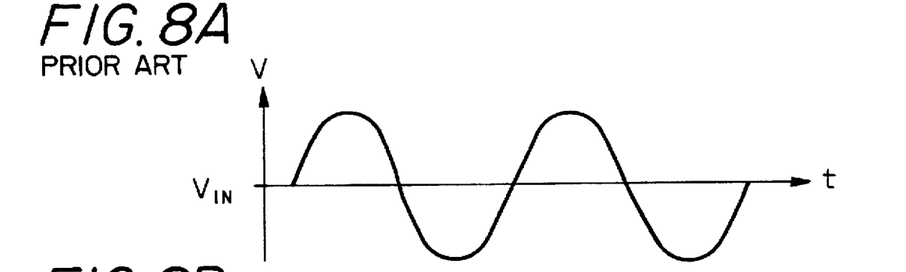
FIG. 8 shows the waveforms of an input voltage $V_{IN}$ and input current $I_{IN}$ appearing in the circuit of FIG. 7.
Figure 8B:
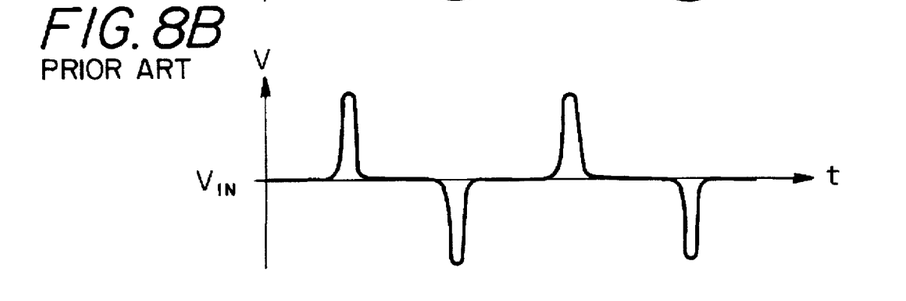

To better understand the present invention, a brief reference will be made to a conventional capacitor input type rectifying circuit, shown in FIG. 7. As shown, a diode rectifying circuit for a commercial power source is provided with a capacitor in order to smooth a diode output. A current $I_{IN}$ input to such a circuit has a pulse-like waveform different from a sinusoidal waveform and contains many higher harmonics, as shown in FIG. 8. Two different approaches have been proposed to suppress power source higher harmonic current. One of them is to insert a reactor while the other is to use an active filter, as stated earlier.

Figure 9:
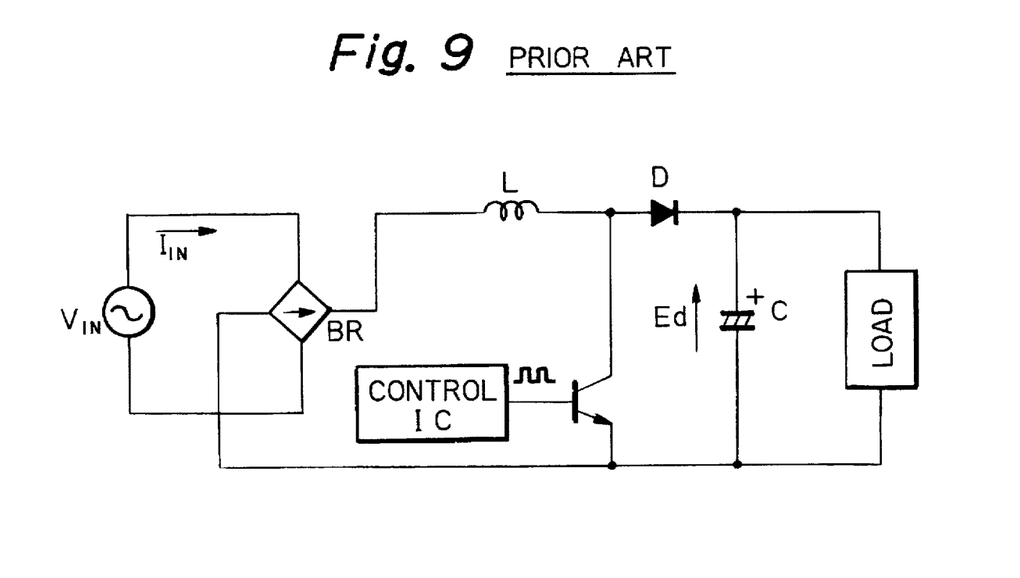
FIG. 9 is a circuit diagram showing a converter using an active filter.

FIG. 9 shows a specific converter configuration implemented by the active filter scheme. As shown, when a control IC (Integrated Circuit) turns on a transistor Q, a power source is short-circuited via a reactor L with the result that the current increases. When the control IC turns off the transistor Q, a capacitor C is charged to a voltage Ed higher than the power source voltage via a diode D, causing the current to decrease. This converter configuration is based on the principle of a booster chopper. When the current of the reactor L is caused to follow a waveform derived from the full-wave rectified power source voltage, the input current and the voltage are provided with the same phase. As a result, a converter whose total force ratio is theoretically 100% is achieved.

Figure 1:
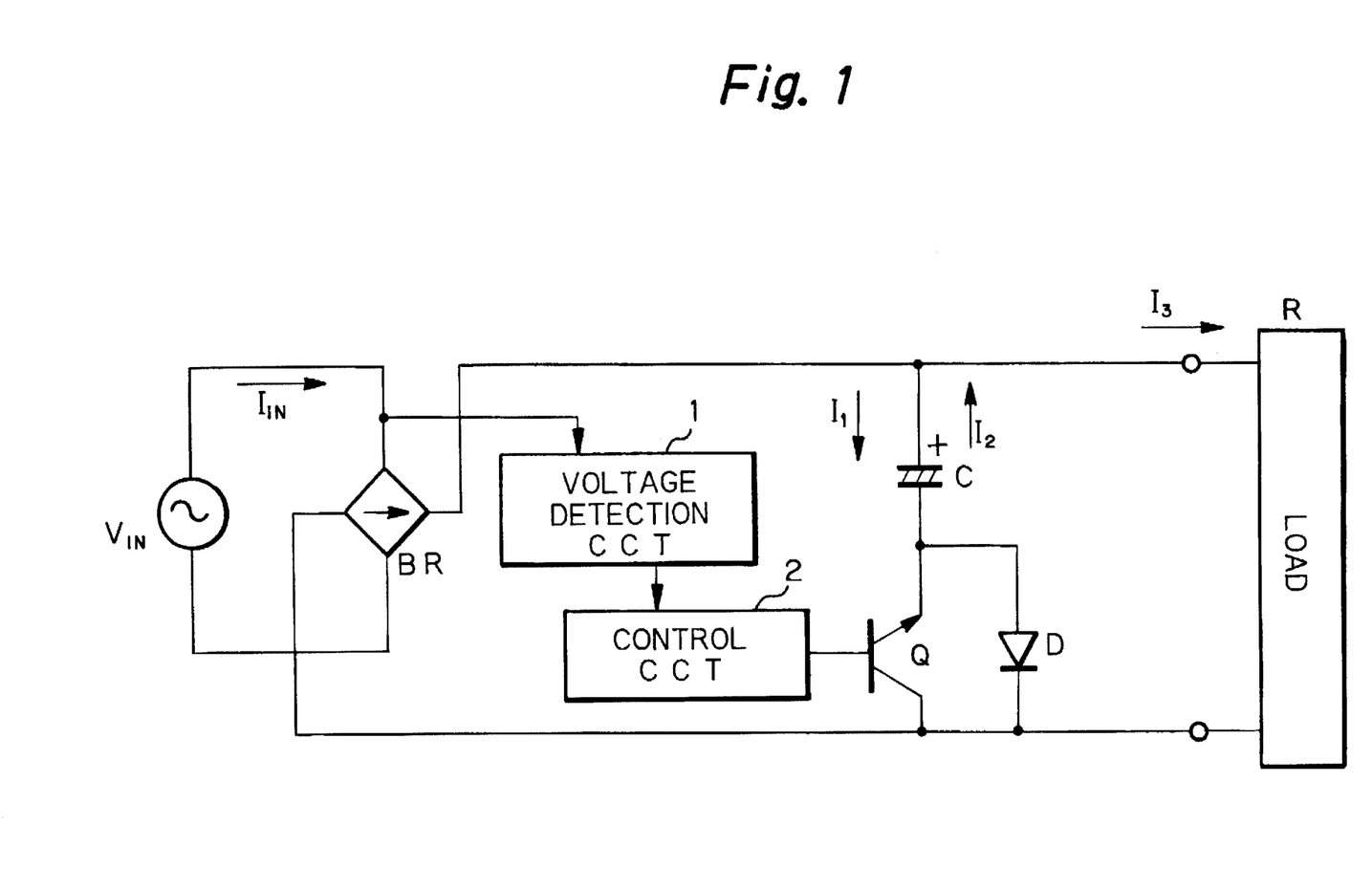
FIG. 1 is a block diagram schematically showing a higher harmonic current suppressing device embodying the present invention.

Referring to FIG. 1 of the drawings, a higher harmonic current suppressing device embodying the present invention is shown and includes a bridge circuit BR connected to a commercial power source $V_{IN}$. The bridge circuit BR is made up of four diodes. A capacitor C and a load R are connected to the bridge circuit BR in parallel. The bridge circuit BR, capacitor C and load R constitute a so-called capacitor input type smoothing circuit. An n-p-n transistor Q is connected in series to the capacitor C. The transistor Q has an emitter connected to the capacitor C and a collector connected to the feedback side of the bridge circuit BR. A diode D is connected between the emitter and the collector of the transistor Q. A voltage detecting circuit 1 detects sinusoidal voltages out of the power source $V_{IN}$. Only when the absolute value of the detected sinusoidal voltage is lower than a predetermined threshold, the detecting circuit 1 feeds an output thereof to a control circuit 2. The control circuit 2 is connected to the base of the transistor Q. On receiving the output of the voltage detecting circuit 1, the control circuit 2 turns on the transistor Q; otherwise, it maintains the transistor Q turned off.

Figure 2:
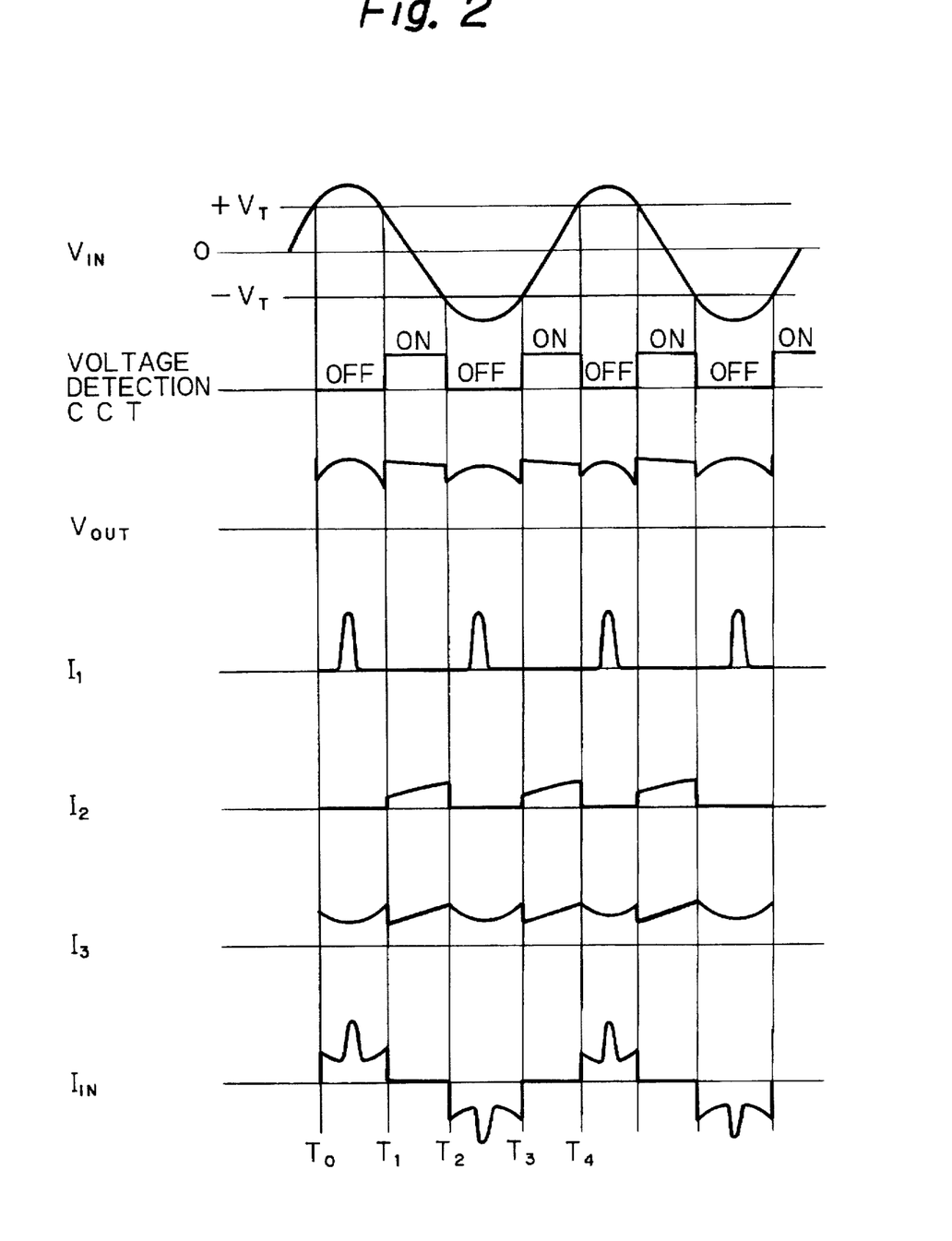
FIG. 2 is a timing chart representing a specific operation of the embodiment.

A specific operation of the suppressing device shown in FIG. 1 will be described with reference also made to FIG. 2. FIG. 2 shows the waveforms of the commercial power source $V_{IN}$, voltage detecting circuit 1, voltage $V_{OUT}$ acting on the load R, current $I_1$ (see FIG. 1) flowing into the capacitor C, current $I_2$ (see FIG. 1) discharged from the capacitor C, current $I_3$ (see FIG. 1) flowing into the load R, and input current $I_{IN}$ (see FIG. 1).

The power source $V_{IN}$ is an AC power source having a frequency of 50 Hz or 60 Hz and a maximum voltage $V_m$ of about 141 V. Assume that the power source voltage $V_{IN}$ rises to $+V_T$ ($|V_T|<|V_m|$) at a time $T_0$, reaches the positive peak $+V_m$, again falls to $+V_T$ at a time $T_1$, further falls to $-V_T$ at a time $T_2$, reaches the negative peak $-V_m$, again rises to $-V_T$ at a time $T_3$, and further rises to $+V_T$ at a time $T_4$. It is to be noted that the voltage $V_T$ is a threshold assigned to the voltage detecting circuit 1 for determining whether or not to send its output to the control circuit 2.

During the interval between the times $T_0$ and $T_1$, the voltage detecting circuit 1 and, therefore, the transistor Q remains in an OFF state. In this condition, the input current $I_{IN}$ full-wave rectified by the bridge circuit BR is split into two, i.e., the current $I_1$ flowing toward the capacitor C and the current $I_3$ flowing toward the load R. The capacitor C is sequentially charged via the diode D and is fully charged when the input voltage reaches a peak. While the capacitor C is so charged, the power supply to the load R is effected with the capacitor C held in an open state. In this manner, from the time $T_0$ to the time $T_1$, the entire current is implemented by the input current $I_{IN}$.

As shown in FIG. 2, during the interval between the times $T_0$ and $T_1$, the current $I_1$ resembles a pulse appearing when the power source voltage $V_{IN}$ reaches the maximum value. The current $I_3$ has a waveform concave downward. Further, the current $I_{IN}$ has a waveform which is the combination of the waveforms of the currents $I_1$ and $I_3$.

From the time $T_1$ to the time $T_2$, the voltage detecting circuit 1 and, therefore, the transistor Q remains in an ON state. The power source voltage $V_{IN}$ at the time when the transistor Q is turned on is $+V_T$. Since the voltage $+V_T$ is lower than the charge voltage of the capacitor C, the capacitor C starts discharging. The charge of the capacitor C is fed to the load R. As a result, the current $I_2$ flows through the load R in place of the current $I_{IN}$. In this manner, the entire power to the load R is implemented by the energy discharged from the capacitor C throughout the interval between the time $T_1$ and $T_2$. Specifically, as shown in FIG. 2, the input current $I_{IN}$ does not flow at all, and the current $I_2$ has a linear waveform.

The operation of the circuitry and the waveforms occurring during the interval between the times $T_0$ and $T_1$ also occur during the interval between the times $T_2$ and $T_3$, except that the polarity of the current $I_{IN}$ is inverted. From the time $T_3$ to the time $T_4$, the same operation and waveforms as during the interval between the times $T_1$ and $T_2$ occur.

As shown in FIG. 2, the output voltage $V_{OUT}$ has a waveform in which the waveform of the power source voltage $V_{IN}$ between the times $T_0$ and $T_1$ and the linear waveform between the times $T_1$ and $T_2$ and above $-VT$ are tied together.

Figure 3:
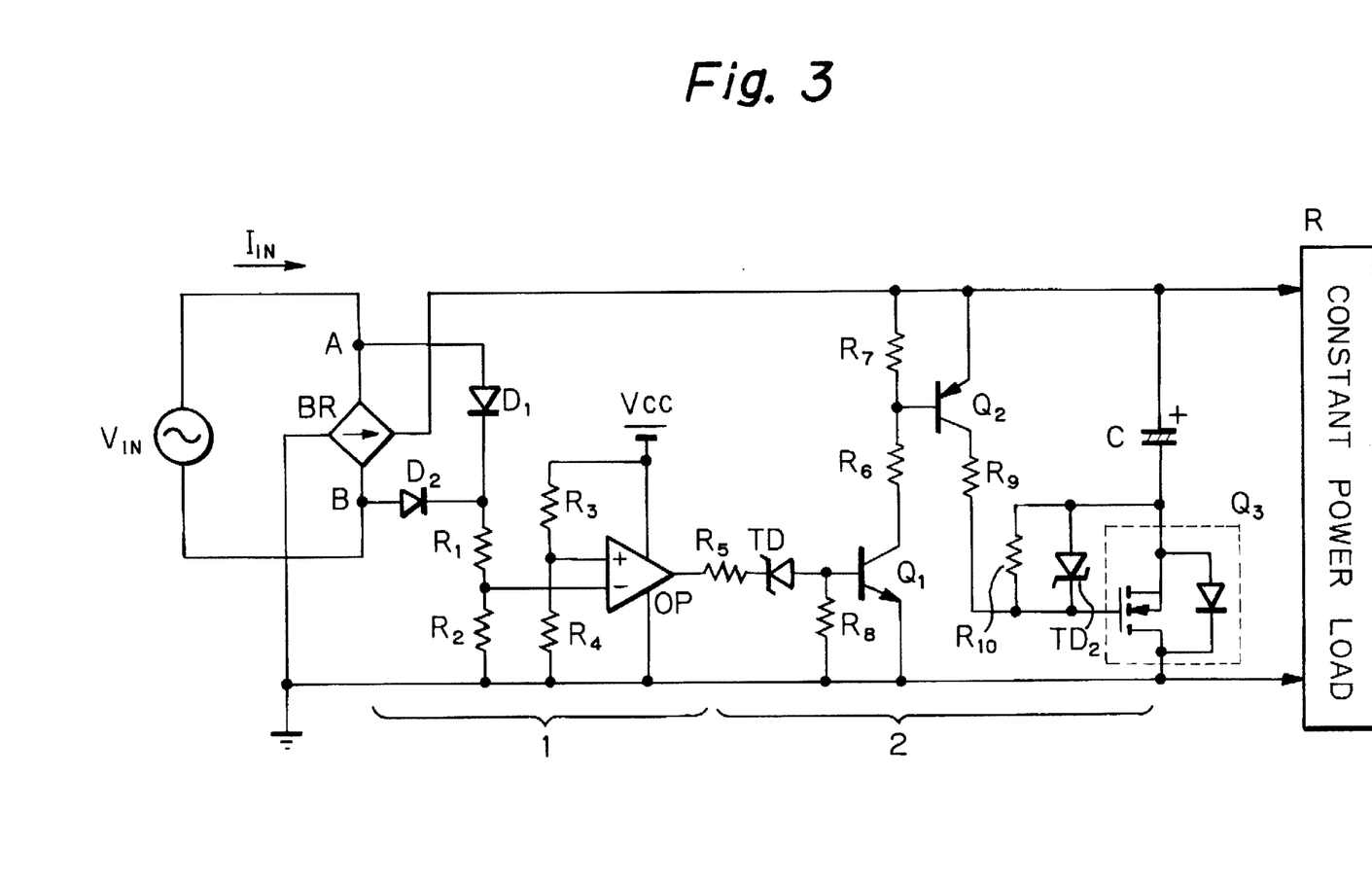
FIG. 3 is a circuit diagram showing the embodiment more specifically.

The suppressing circuit of FIG. 1 is shown in FIG. 3 more specifically. As shown, the capacitor C, load R, transistor Q and diode D are respectively implemented as a capacitor having a capacity of 500 μF, a MOS (Metal-Oxide Semiconductor) FET (Field Effect Transistor) Q3, and a body diode built in the MOS FET.

The voltage detecting circuit 1 will be described with reference to FIG. 3. Diodes $D_1$ and $D_2$ have their positive terminals respectively connected to junctions A and B where the commercial power source $V_{IN}$ and bridge circuit BR are connected to each other. The negative terminals of the diodes $D_1$ and $D_2$ are connected to each other. A resistor $R_1$ whose resistance is 98 kΩ is connected to the negative terminal of the diode $D_1$ ($D_2$). A resistor $R_2$ whose resistance is 2 kΩ is connected in series to the resistor $R_1$ at one end and connected to ground at the other end. The junction between the resistors $R_1$ and $R_2$ is connected to the negative input terminal of an operational amplifier OP. A power source $V_{CC}$ for the operational amplifier OP is implemented as an external DC 20 V power source. A resistor $R_3$ having a resistance of 18.4 kΩ is connected to the power source $V_{CC}$. A resistor $R_4$ whose resistance is 1.6 kΩ is connected to the resistor $R_3$ at one end and connected to ground at the other end. The junction between the resistors $R_3$ and $R_4$ is connected to the positive input terminal of the operational amplifier OP.

The voltage detecting circuit 1 having the above construction detects the commercial power source voltage $V_{IN}$ by using a threshold of 80 V. When the power source $V_{IN}$ rises above 80 V, the operational amplifier OP generates a detection signal.

As also shown in FIG. 3, the control circuit 2 has a resistor $R_5$ having a resistance of 100 Ω and connected to the output terminal of the operational amplifier OP. A Zener diode $TD_1$ whose capacity is 3.3 V has a negative terminal connected in series to the resistor $R_5$ and a positive terminal connected to the base of an n-p-n transistor $Q_1$. The emitter of the transistor $Q_1$ is connected to ground. Resistors $R_6$ and $R_7$ having resistances of 47 kΩ and 10 kΩ, respectively, are connected in series to the collector of the transistor $Q_1$. The other end of the resistor $R_7$ is connected to the output terminal of the bridge circuit BR. A resistor $R_8$ having a resistance of 1 kΩ is connected between the base of the transistor $Q_1$ and the Zener diode $TD_1$ at one end and connected to ground at the other end. A p-n-p transistor $Q_2$ has a base connected to the junction between the resistors $R_6$ and $R_6$, an emitter connected to the output terminal of the bridge circuit BR, and a collector connected to a resistor $R_9$ having a resistance of 47 kΩ. The other end of the resistor $R_9$ is connected to the gate of a MOS FET $Q_3$. A parallel connection of a Zener diode $TD_2$ having a capacity of 20 V and a resistor $R_{10}$ having a resistance of 10 kΩ is connected between the gate and the source of the MOS FET $Q_3$. The negative terminal of the Zener diode $TD_2$ is connected to the gate of the MOS FET $Q_3$.

The control circuit 2 selectively turns on or turns off the MOS FET $Q_3$ in response to the output of the voltage detecting circuit 1. It is to be noted that the source and the drain of the MOS FET $Q_3$ are connected to the negative terminal of the capacitor C and ground, respectively.

Figure 4:
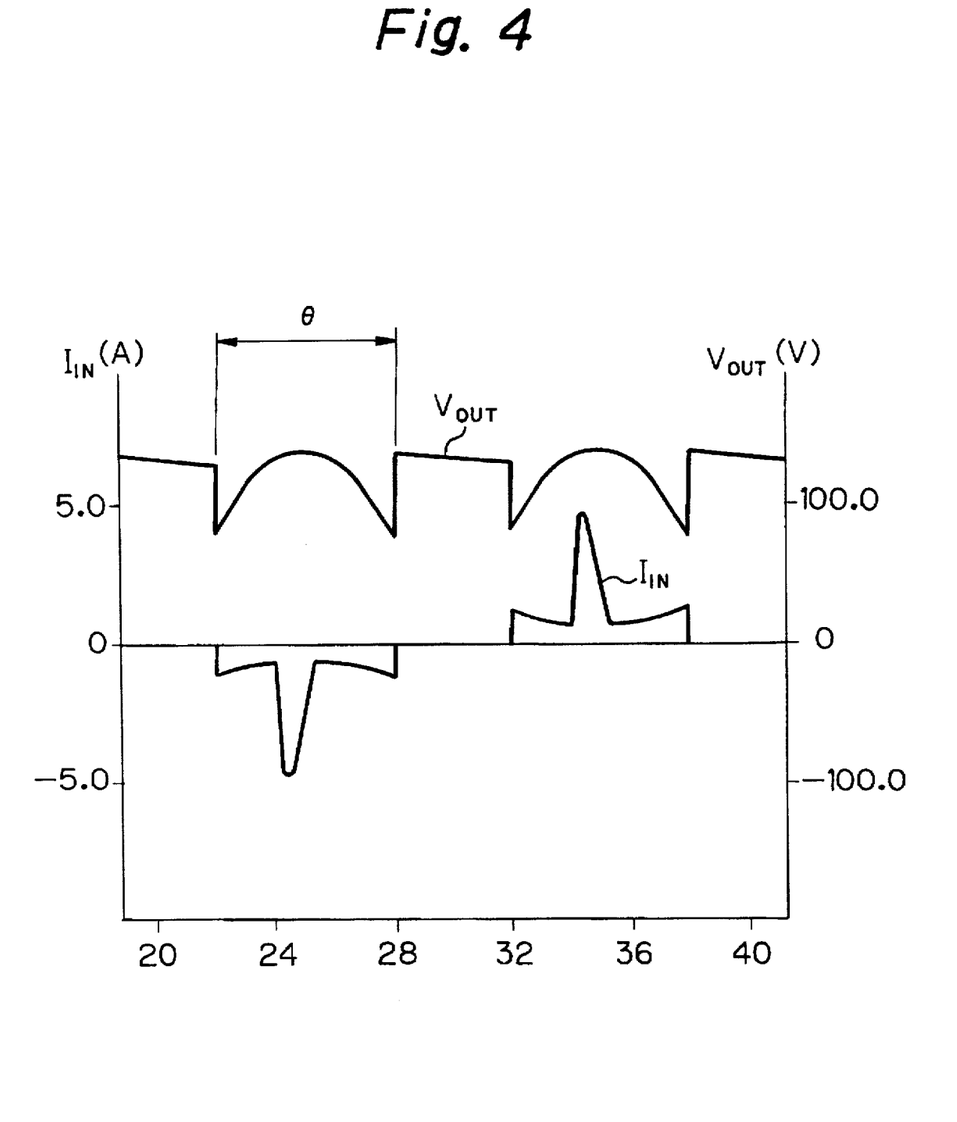
FIG. 4 shows waveforms indicating a relation between an output voltage $V_{OUT}$ and an input current $I_{IN}$ appearing in the circuit of FIG. 3.
Figure 5:
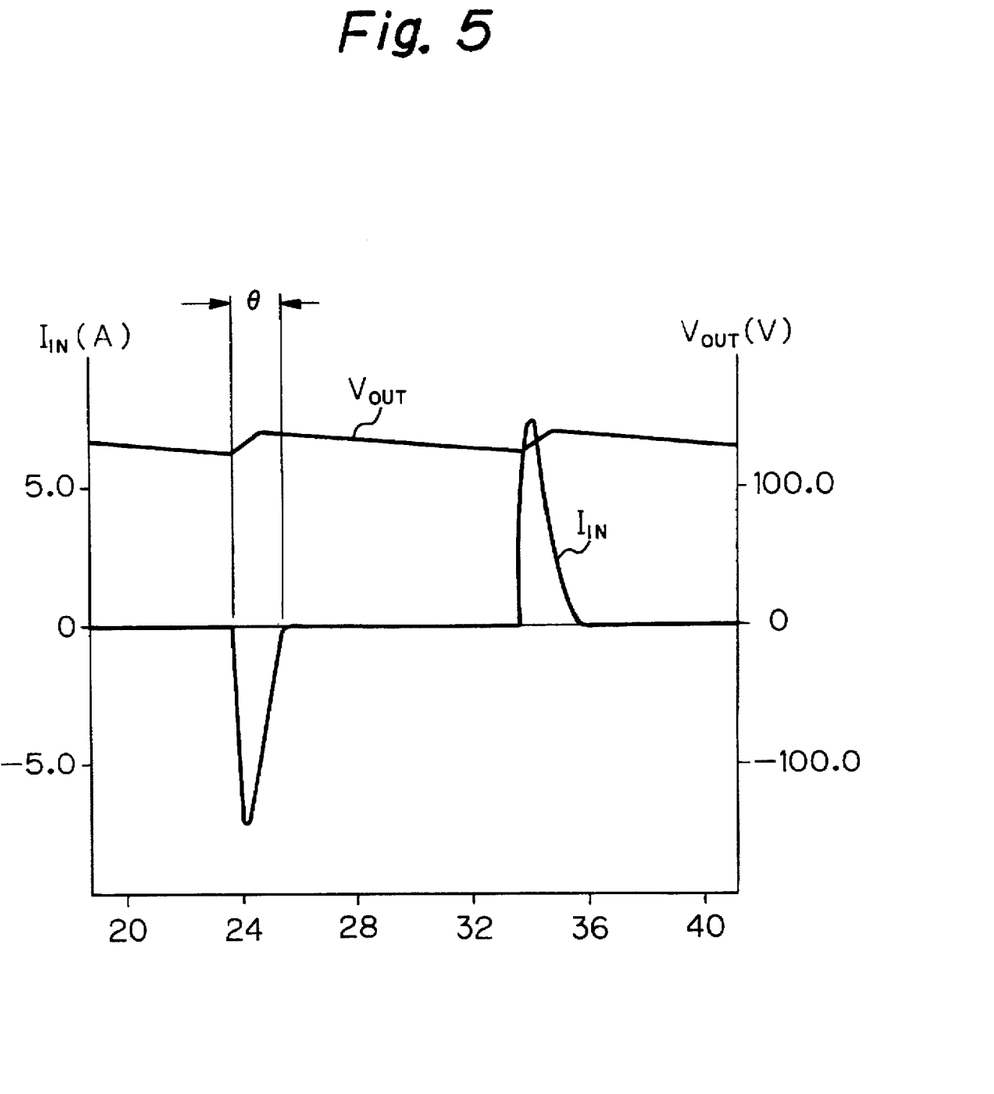
FIG. 5 shows waveforms indicating a relation between an output voltage $V_{OUT}$ and an input current $I_{IN}$ particular to a capacitor input type rectifying circuit lacking a measure against higher harmonic current.

FIG. 4 shows waveforms representing a relation between the output voltage $V_{OUT}$ and the input current $I_{IN}$ to appear in the circuitry shown in FIG. 3. For comparison, FIG. 5 shows a relation between an output voltage $V_{OUT}$ and an input voltage $V_{IN}$ particular to a conventional capacitor input type rectifying circuit lacking a measure against higher harmonic current. It will be seen that the illustrative embodiment provides the input current $I_{IN}$ with a greater conduction angle θ than the conventional circuit and, in addition, provides it with a lower peak current than the latter. The embodiment, therefore, allows the conduction angle θ to be increased and, therefore, allows higher harmonics to be reduced.

Various systems are available for the voltage detecting circuit 1. When the circuit 1 is simply constructed to slice a constant voltage, it is possible to change the conduction angle θ simply be setting the threshold voltage. This promotes easy designing for any desired equipment. Generally, a converter is operable over a range above DC 80 V. When the threshold level is selected to be 80 V, as in the embodiment, the conduction angle θ of 110° is achievable, as produced by:

$$\sin\theta' = \frac{80(V)}{141(V)} = 0.57$$

$$\theta' = 35°$$
$$\theta = 180° - 2\theta' = 110°$$

Specifically, part of the power from the commercial power source $V_{IN}$ corresponding to the conduction angle θ of 110° is directly applied to the load R without the intermediary of the capacitor C. This successfully reduces ripple current in the capacitor C and thereby enhances the reliability of the circuitry.

At the time when the capacitor C starts discharging, the angle available with the state-of-the-art system is 90°. In contrast, the embodiment implements an angle of 90°+(110°/2)=145°. As a result, a period of time corresponding to 180°−145°=55°, i.e., 20 ms×55°/360°=3 ms is achieved as a margin. Then, assuming that the standard at the beginning of discharge is 10 ms, the capacity of the capacitor C can be reduced by 30%. This, coupled with the reduction of the ripple current, lowers the size and cost of the capacitor C to a significant degree.

In summary, it will be seen that the present invention provides a suppressing device capable of suppressing higher harmonic current by increasing the conduction angle of input current. Also, the device of the invention reduces effective input current and thereby increases the force ratio. Further, when input current is coincident with the conduction angle, energy for a load is directly implemented by input voltage. Hence, the device reduces energy to be assigned to an input capacity. It follows that the capacity and ripple current of the input capacitor and, therefore, the cost can be reduced.

Figure 6:
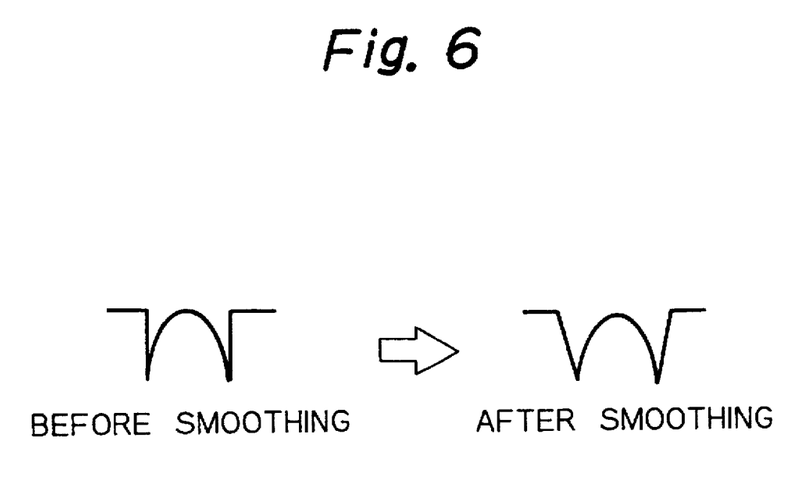
FIG. 6 shows how the output voltage $V_{OUT}$ is smoothed.

Various modifications will become possible for those skilled in the art after receiving the teachings of the present disclosure without departing from the scope thereof. For example, the operational amplifier OP shown in FIG. 3 may be replaced with a comparator. However, the operational amplifier which has linearity is more preferable than a comparator in smoothing the waveform of the output voltage $V_{OUT}$ as shown in FIG. 6. While the embodiment has an n-p-n transistor or a MOS FET as switching means, such switching means is only illustrative and may be replaced with a p-n-p transistor, relay or the like.

What is claimed is:

1. A device for suppressing higher harmonic current of a power source, comprising:

switching means for causing a capacitor, included in a capacitor input type rectifying circuit for a commercial power source, to selectively charge or discharge;

voltage detecting means for receiving and detecting a sinusoidal voltage out of the commercial power source and generating an output signal only when an absolute value of said received and detected sinusoidal voltage is lower than a predetermined voltage; and control means for turning on said switching means in response to receiving the output signal from said voltage detecting means to thereby cause the capacitor to release a charge only when the sinusoidal voltage is lower than the predetermined voltage.

2. A device as claimed in claim 1, wherein said switching means comprises a MOS FET.

3. A device as claimed in claim 1, wherein said switching means comprises an n-p-n transistor.

4. A device as claimed in claim 1, wherein said switching means comprises a p-n-p transistor.

5. A device as claimed in claim 1, wherein when the absolute value of said sinusoidal voltage is higher than the predetermined voltage, said control means turns off said switching means to thereby cause the capacitor to be charged.

6. A device for suppressing higher harmonic current of a power source, comprising:

a switch causing a capacitor, included in a capacitor input type rectifying circuit for a commercial power source, to selectively charge or discharge;

a voltage detector receiving and detecting a sinusoidal voltage out of the commercial power source and generating an output signal only when an absolute value of said received and detected sinusoidal voltage is lower than a predetermined voltage; and a controller turning on said switching means in response to receiving the output signal from said voltage detector to thereby cause the capacitor to release a charge only when the sinusoidal voltage is lower than the predetermined voltage.

7. A device as claimed in claim 6, wherein said switch comprises a MOS FET.

8. A device as claimed in claim 6, wherein said switch comprises an n-p-n transistor.

9. A device as claimed in claim 6, wherein said switch comprises a p-n-p transistor.

10. A device as claimed in claim 6, wherein when the absolute value of said sinusoidal voltage is higher than the predetermined voltage, said control means turns off said switching means to thereby cause the capacitor to be charged.

* * * * *